Patented June 9, 1942

2,285,483

UNITED STATES PATENT OFFICE 2,285,483

MANUFACTURE OF SULPHO-TRIMELLITIC ACID

Max Wyler, Blackley, Manchester, England, assignor to Imperial Chemical Industries Limited, a corporation of Great Britain No Drawing. Application July 31, 1940, Serial No. 349,001. In Great Britain July 31, 1939

8 Claims. (Cl. 260—507)

The present invention relates to the manufacture of dyestuff intermediates, namely sulphotrimellitic acid, and hydroxytrimellitic acid.

Both the sulphotrimellitic acid (i. e. 5-sulphobenzene-1,2,4-tricarboxylic acid) and the hydroxytrimellitic acid (i. e. 5-hydroxybenzene-1,2,4-tricarboxylic acid) are known.

The present invention relates to a convenient process for the manufacture of these compounds from crude xylene, which is a mixture of the three isomeric xylenes or dimethylbenzenes. When a mixture of three xylenes is treated with an alkylphenylcarbamyl chloride (or phosgene and an alkylaniline) in the presence of aluminium chloride mixed xylic acids (i. e. dimethylbenzene carboxylic acids) are formed, which seemingly are so orientated as to yield on oxidation, one compound, namely benzene-1,2,4-tricarboxylic acid. Thus, when crude xylene is similarly treated it can be expected that the product will be a mixture of the dimethylbenzene carboxylic acids. If these are oxidised then seemingly all should give trimellitic acid (i. e. benzene-1,2,4-tricarboxylic acid).

The present invention is based on the discovery, that when the mixed xylic acids referred to above are sulphonated, there are formed such sulphodimethylbenzene carboxylic acids that when the product of the sulphonation is oxidised, sulphotrimellitic acid is obtained in good yield. This was not to be expected in view of the number of possibilities in different orientation of the sulpho group.

According to the invention the mixed xylic acids obtained from crude xylene in the manner described are sulphonated and the product oxidised to give sulphotrimellitic acid.

Further, according to the invention the sulphotrimellitic acid so obtained is subjected to an alkali fusion for the replacing of sulpho by hydroxy to give hydroxytrimellitic acid.

The following examples, in which the parts are by weight, illustrate but do not limit the invention.

Example 1

150 parts of mixed xylene carboxylic acids (obtained as described below) are dissolved in 600 parts 30% oleum. The solution is heated to 100° C. and the temperature maintained for 1 hour. After cooling, the reaction mixture is poured into 2000 parts of water, whereupon 150 parts of sodium chloride are added, the mixture warmed to 90° C. and allowed to stand for 12 hours. A crystalline deposit of a mixture of sulphodimethylbenzene carboxylic acids in the form of their mono-sodium salts is formed.

The mono-sodium salts of the mixed sulphodimethylbenzene carboxylic acids obtained in the above manner are dissolved in 4000 parts of water and the solution made alkaline with sodium hydroxide, and heated to 70-90° C. Potassium permanganate (about 500 parts) is then added until it is no longer decolourised. The sediment is filtered off, washed and the filtrate evaporated down to one-fifth its original volume and acidified with hydrochloric acid. When cold the precipitated dipotassium salt of sulphotrimellitic acid is filtered off, washed and dried. It forms large prismatic crystals.

The mixed xylene carboxylic acids employed above as starting material are obtainable from crude xylene in the following way. A mixture of 318 parts of crude xylene and 183 parts of monoethylaniline is saturated with phosgene at 0-15° C. The resulting crystalline mass is heated to 95° C., and more phosgene is led in until a clear solution is obtained. Phosgene is then passed for 1 hour longer, the solution cooled to 65° C. and 225 parts of anhydrous aluminium chloride stirred in during 1 hour. The temperature is raised to 110° C. and maintained thereat until most of the hydrogen chloride has been evolved. The product is diluted with ice-cold water and unreacted xylene recovered by steam-distillation. The residual oil is separated from the aqueous layer, washed with water, dissolved in 1200 parts of 65% sulphuric acid and the solution heated at 140-150° for 3 hours. The precipitate obtained on cooling is separated and dissolved in 1000 parts of hot water containing sufficient sodium hydroxide to give an alkaline solution which is then filtered hot. The filtrate is acidified with hydrochloric acid and the precipitated mixed xylene carboxylic acids filtered off, washed and dried.

Example 2

117 parts of the dipotassium salt of sulphotrimellitic acid obtained according to Example 1 are stirred into 300 parts of molten potassium hydroxide at 170° C. The temperature is raised to 220-230° C. and held thereat for 1 hour. The melt is poured into 1200 parts of water, which is then acidified with hydrochloric acid. After heating to drive off the sulphur dioxide, the solution is cooled and the hydroxytrimellitic acid filtered off. It forms white crystals and may be purified by recrystallising from dilute hydrochloric acid (M. P. 235° C.).

As many apparently widely different embodiments of this invention may be made without departing from the spirit and scope thereof, it is to be understood that we do not limit ourselves to specific embodiments except as defined in the appended claims.

I claim:

1. A process for the manufacture of 5-sulpho-1,2,4-trimellitic acid which comprises sulphonating a mixture of the xylic acids as obtainable by introducing a carboxy group, by Friedel-Crafts' synthesis, into a mixture of isomeric xylenes; and then oxidizing the mixture of sulpho-dimethyl-benzene-carboxylic acids thus obtained to convert the methyl groups into carboxy-groups.

2. A process as in claim 1, wherein the mixture of xylic acids initially employed is that obtainable by introducing a carboxy group, by Friedel-Crafts' synthesis, into the mixture of xylenes represented by crude, commercial xylene.

3. A process for the manufacture of 5-sulpho-1,2,4-trimellitic acid which comprises reacting a mixture of isomeric xylenes, in the presence of aluminum chloride, with the reaction product of phosgene and an alkyl-aniline, hydrolyzing the intermediate amide and recovering a mixture of isomeric xylic acids, then sulphonating the mixture and further subjecting the same to oxidation to convert the methyl groups into carboxy groups.

4. A process as in claim 3, wherein the mixture of xylenes initially employed is that represented by crude, commercial xylene.

5. A process as in claim 1, wherein the sulphonation is carried out at an elevated temperature.

6. A process as in claim 1, wherein the sulphonation is effected by means of oleum and is finished at a temperature of about 100° C.

7. A process for the manufacture of 5-sulpho-1,2,4-trimellitic acid which comprises reacting upon crude xylene with a monoalkyl-aniline, phosgene, and aluminum chloride to product an intermediate alkyl-anilide of xylic acid in complex combination with aluminum chloride; treating this reaction product with acid to split off the aluminum chloride complex; hydrolyzing the resulting amide compound with caustic to produce a mixture of xylic acid salts; separating the latter from the by-product alkyl-aniline, acidifying to produce a mixture of xylic acids; treating the latter with oleum at a temperature of about 100° C. to produce a mixture of sulphonated-dimethyl-benzene mono-carboxylic acids, and subjecting the latter mixture to oxidation whereby to convert substantially the entire mixture into a single mono-sulpho-benzene-tricarboxylic acid.

8. In the process of converting a mixture of xylene-mono-carboxylic acids into a mono-sulphonic acid derivative thereof to obtain a reaction mixture adapted for further conversion into sulpho-trimellitic acid by controlled oxidation of the methyl groups, the improvement which consists in carrying out the sulphonation by means of oleum and heating the sulphonation mass to about 100° C., whereby to obtain a reaction product which upon oxidation will result in a single isomer.

MAX WYLER.